(12) United States Patent
Hackett et al.

(10) Patent No.: US 8,157,003 B2
(45) Date of Patent: Apr. 17, 2012

(54) INTEGRATED CARBON MANAGEMENT SYSTEM FOR PETROLEUM REFINING

(75) Inventors: David J. Hackett, Irvine, CA (US); Marshall A. Bell, Manhattan Beach, CA (US)

(73) Assignee: Stillwater Energy Group, LLC, Irvine, CA (US)

( * ) Notice: Subject to any disclaimer, the term of this patent is extended or adjusted under 35 U.S.C. 154(b) by 94 days.

(21) Appl. No.: 12/640,284

(22) Filed: Dec. 17, 2009

(65) Prior Publication Data

US 2010/0155048 A1 Jun. 24, 2010

Related U.S. Application Data

(60) Provisional application No. 61/138,828, filed on Dec. 18, 2008.

(51) Int. Cl.
*E21B 21/06* (2006.01)
(52) U.S. Cl. ....... 166/75.12; 166/57; 166/90.1; 210/767
(58) Field of Classification Search ........................ None
See application file for complete search history.

(56) References Cited

U.S. PATENT DOCUMENTS

2010/0243248 A1* 9/2010 Golomb et al. ............... 166/270

OTHER PUBLICATIONS

Burton et al., "Geologic Carbon Sequestration Strategies for California, The Assembly Bill 1925 Report to the California Legislature", California Energy Commission, Systems Office. CEC-500-2007-100-SF, Nov. 2007, 156 pgs.

Guerrero, "Emulsion fuel options still viable for heavy oil", Oil&Gas Journal, vol. 106, Issue 36, pp. 1-5, 5.
Hagglund, "Comparative advantages of Orimulsion®, LNG and Petcoke", Jun. 2002, 42.
Jazayeri, "Request to Establish a Memorandum Account and Authorization to Recover Up to $30 Million in Costs for a California IGCC Study", Advice 2274-E (U 338-E), Oct. 10, 2008, 122.
McGehee, "Solvent Deasphalting in Today's Deep Conversion Refinery", AIChE—Chicago Symposium, Oct. 2, 2006, 44.
Patel, et al., "To Vacuum or not to Vacuum", Hydrocarbon Engineering, Jun. 2007, pp. 1-5, Jun. 2007, 5.
Plasynski et al., "Carbon Sequestration Newsletter, Sep. 2008, pp. 1-9".
Rosenquist et al., "Design Considerations for the Combustion of Bitumen-Based Fuels", Oil Sands and Heavy Oil Technologies Conference, Jul. 2007, 9.
Subramanian, "Swimming Against the Current? Taking a proven downstream technology to the Wellhead", KBR 2007 Rose Licensee Conference, Aug. 2007, 16.
Unknown, "Application for Certification, vol. 1, Hydrogen Energy California", Jul. 2008, 25.
Unknown, "Basin Oriented Strategies for CO2 Enhanced Oil Recovery: California", Apr. 2005, 80.
Unknown, "Carbon Sequestration Atlas of the United States and Canada", 2008, 28.
Unknown, "Rose: The New Solution to Heavy Oil Upgrading", 6 undated.

* cited by examiner

*Primary Examiner* — Zakiya W Bates
(74) *Attorney, Agent, or Firm* — Kauth, Pomeroy, Peck & Bailey LLP

(57) ABSTRACT

An environmentally and economically more efficient petroleum production/refining/utilization system for managing carbon emissions at all stages of the petroleum lifecycle is provided. The system of the current invention integrates the release of carbon from refined low value, high polluting petroleum products such that those sources of carbon may be utilized in a manner beneficial to the efficiency and environmental footprint of the overall petroleum processing lifecycle.

23 Claims, 7 Drawing Sheets

FIG. 4

~5 microns oil-in-water emulsion 80 to 100 microns    80 to 100 microns

Steam Atomized Heavy Fuel Droplet    Pre-Atomized MSAR Droplet

INTEGRATED CARBON MANAGEMENT SYSTEM FOR PETROLEUM REFINING

RELATED APPLICATIONS

This application claims priority to U.S. Provisional Application No. 61/138,828 filed Dec. 18, 2008, the disclosure of which is incorporated herein by reference.

FIELD OF THE INVENTION

This invention relates generally to an improved carbon management system for producing, refining and consuming petroleum; and more particularly to a process for efficiently converting low-valued waste products from petroleum refining into energy sources and utilizing those energy sources in an environmentally sound manner that simultaneously promotes further energy production.

BACKGROUND OF THE INVENTION

The potential problems caused by increasing concentrations of greenhouse cases, such as $CO_2$ and methane, in the atmosphere have been the source of growing concern over the past decade. Although still controversial, the identification of human activity as the primary source of the increased levels of these gases has gained greater and greater acceptance in scientific and political circles. (See, e.g., Solomon, S., et al. (eds.), "Chapter 7. Couplings Between Changes in the Climate System and Biogeochemistry", Climate Change 2007: The Physical Science Basis. Contribution of Working Group I to the Fourth Assessment Report of the Intergovernmental Panel on Climate Change. Cambridge, United Kingdom and New York, N.Y., USA: Cambridge University Press. ISBN 978-0-521-88009-1 (2007), the disclosure of which is incorporated herein by reference). For example, measurements from Antarctic ice cores show that just before industrial emissions started, and for the preceding 10,000 years, atmospheric $CO_2$ levels remained constant at about 280 ppm. However, since the beginning of the Industrial Revolution, the concentrations of many of these greenhouse gases have increased. In particular, the concentration of $CO_2$ has increased by about 100 ppm (i.e., from 280 ppm to 380 ppm) over this period of time. Moreover, the first 50 ppm increase took place in about 200 years, from the start of the Industrial Revolution to around 1973, while the next 50 ppm increase took place in only 33 years, from 1973 to 2006. (See, e.g., Le Treut, et al., Historical Overview of Climate Change Science In: Climate Change 2007: The Physical Science Basis. Contribution of Working Group I to the Fourth Assessment Report of the Intergovernmental Panel on Climate Change [Solomon, S., et al., (eds.)]. Cambridge University Press, Cambridge, United Kingdom and New York, N.Y., USA (2007), the disclosure of which is incorporated herein by reference.)

Moreover, the recent focus on greenhouse gases has not had a significant impact on reducing $CO_2$ emission or the concentration of $CO_2$ in the atmosphere. Indeed, there has been a sharp acceleration in $CO_2$ emissions since 2000 of greater than 3% per year, up from an average increase of only ~1.1% per year during the 1990s. (See, Raupach, M. R. et al. Proc. Nat. Acad. Sci. 104(24): 10288-10293 (2007), the disclosure of which is incorporate herein by reference.) In comparison, methane has not increased appreciably over this time frame, and nitrous oxide ($N_2O$) has increased by a constant rate of only ~0.25% per year. (See, IPCC Special Report on Emissions Scenarios, Chapter 3, (2000), the disclosure of which is incorporated herein by reference.) What is more, over the 2000-2010 interval China is expected to increase its $CO_2$ emissions by 600 Mt, largely because of the rapid construction of old-fashioned power plants in poorer internal provinces. (See, Auffhammer, M., et al., Journal of Environmental Economics and Management 55 (3): 229-247 (2008), the disclosure of which is incorporated herein by reference.)

From a climate change perspective, the increase in $CO_2$ concentration is of particular concern because its radiative impact is many factors higher than the next significant greenhouse gas. For example, $CO_2$ has a radiative force of 1.46 $W/m^2$, while methane has a radiative force of only 0.48 $W/m^2$. (Radiative force is a measure of the increase in the radiative energy available to Earth's surface and to the lower atmosphere as the result of the presence of a particular molecule. See, Kiehl, J. T., Bulletin of the American Meteorological Society 78 (2): 197-208, the disclosure of which is incorporated herein by reference.) In addition, recent research suggests that the atmospheric lifetime of $CO_2$ may be substantial higher than previously suspected. The atmospheric lifetime of a species measures the time required to restore equilibrium following an increase in its concentration in the atmosphere. Individual atoms or molecules may be lost or deposited to sinks such as the soil, the oceans and other waters, or vegetation and other biological systems, reducing the excess to background concentrations. The average time taken to achieve this is the mean lifetime. $CO_2$ has a variable atmospheric lifetime, and cannot be specified precisely. (See, Solomon, S, et al. eds., IPCC, 2007: Climate Change 2007: The Physical Science Basis. Contribution of Working Group I to the Fourth Assessment Report of the Intergovernmental Panel on Climate Change, Cambridge, United Kingdom and New York, N.Y., USA: Cambridge Press, ISBN 978-0521-88009-1, (2007), the disclosure of which is incorporated herein by reference.) It has often incorrectly been stated that $CO_2$ has an atmospheric lifetime of only a few years because that is the average time for any $CO_2$ molecule to stay in the atmosphere before being removed by mixing into the ocean, or by photosynthesis or other processes. However, this ignores the balancing fluxes of $CO_2$ emission into the atmosphere from the other reservoirs. It is the net concentration change of the various greenhouse gases by all sources and sinks that determines atmospheric lifetime, not just the removal processes. For example, recent work indicates that recovery from a large input of atmospheric $CO_2$ from burning fossil fuels will result in an effective lifetime of tens of thousands of years. (See, e.g., Archer, D., Journal of Geophysical. Research 110 (C9): C09S05.1-009S05.6 (2005); and Caldeira, K., et al., Journal of Geophysical Research 110 (C9): C09S04.1-009S04.12 (2005), the disclosures of which are incorporated herein by reference.)

Production of $CO_2$ globally has been brought into sharp focus in recent years through declarations such as the Kyoto accord, and also by industry leaders committing to tangible reductions in $CO_2$ emissions. In essence, the Kyoto accord distilled a global problem into a national one, by setting emission targets for greenhouse gases compared with a baseline 1990 level, with a view to pegging and reducing global emissions. How individual nations, economic communities (such as the EU) and industry react to the growing pressures to reduce $CO_2$ is still to be formulated and ratified. A key element in the debate is whether specific industries should be targeted and whether $CO_2$ trading should be allowed across national boundaries and/or industries.

One industry that has been the early target of regulation is the energy sector. Within the energy sector, petroleum refining is by far the largest carbon emitter for the petroleum and coal products industry, accounting for around 5% of all $CO_2$ emissions relating to the processing of petroleum products (over 90% comes from the burning of petroleum products). The petroleum refining industry uses almost 30 percent of all energy used in manufacturing and emits over 20 percent of the carbon dioxide. (Battles, S., Energy Information Administration, "1994 Manufacturing Energy Consumption Survey'", "Monthly Refinery Report" for 1994, and Emissions of Greenhouse Gases in the United States 1998, the disclosures of which are incorporated herein by reference.) As a result, petroleum refining has come under increasing scrutiny from regulators. For example, the state of California is developing rules around their Global Warming Solutions Act (AB32) and is looking for ways to significantly reduce $CO_2$ production. Refineries and power plants are the largest targets of this rule making. In addition, a recently filed suit, led by New York Attorney General Andrew Cuomo, and filed on behalf of a dozen states including California, Connecticut, Delaware, Massachusetts, Maine, New Hampshire, New Mexico, Oregon, Rhode Island, Vermont, and Washington, as well as the District of Columbia and the City of New York, charges that the Environmental. Protection Agency violated the federal Clean Air Act by refusing to issue standards, known as new source performance standards, for controlling global warming pollution emissions from oil refineries. (See, Chemical & Engineering News Vol. 86 No. 35, 1 Sep. 2008, "Challenging EPA", p. 11, the disclosure of which is incorporated herein by reference.) The suit seeks to force the EPA to control oil refinery emissions of greenhouse pollution and to order the agency to adopt the standards. Among other things, the suit contends that about 15 percent of US industrial emissions of carbon dioxide come from crude refineries, which burn some oil as they make products like gasoline and jet fuel. Likewise, Australia has many industries that are emissions-intensive and trade-exposed, so-called EITE industries. Emissions-intensive means the costs of their carbon emissions under an emissions trading scheme will have a material impact on their cost structure and profitability. Among the industries targeted by the Australian government by this program is oil refining, which the industry argues may create a price for carbon that makes oil refining in the country uncompetitive in a global market.

In addition, the public has put strong pressure on the local and national governments to prevent the development of new refineries. These efforts have been largely successful in the United States, where no major refinery has been built since Marathon's Garyville, La. facility in 1976. Additionally, many refineries (over 100 since the 1980s) have closed due to obsolescence and/or merger activity within the industry itself. There is a growing awareness that this lack of development will need to be addressed, particularly as environmental restrictions and the pressure to prevent construction of new refineries is one of the contributing factors to the rising price of refined fuels in the United States. (Hargreaves, S., "Behind high gas prices: The refinery crunch", CNNMoney.com Apr. 17, 2007, the disclosure of which is incorporated herein by reference.) However, there is an increasing recognition that for the petroleum refining industry to survive refineries must be modified to reduce their environmental footprint, including their $CO_2$ emissions.

While several strategies have been proposed to make the petroleum industry more efficient, thus far these systems have focused only on specific and isolated segments of the petroleum lifecycle. For example, proposals have been made to address the inefficiencies of power generation at refineries, either by using lower carbon fuels for power generation, or by using gasification, which allows for heavy residue destruction and relatively easy $CO_2$ capture and other environmental benefits. However, over half of petroleum refining carbon emissions are generated from petroleum by-products (chiefly still gas and petroleum coke) that are further processed and used as lower grade fuels. Thus far no economically practical systems have been proposed to address the efficiency of the overall petroleum refining industry, including how to address these "by-product" carbon sources. Accordingly, an integrated system to manage $CO_2$ emission from the processing and use of these "by-product" fuels, and to provide a more efficient overall petroleum lifecycle is needed.

BRIEF SUMMARY OF THE INVENTION

Thus, there is provided in the practice of this invention according to a presently preferred embodiment a petroleum carbon management system for integrating a source of combustible fuel with a combustion facility, a combustion source with a crude oil production facility, and a crude oil production facility with a petroleum processing facility.

In one embodiment, the system of the current invention integrates a refinery, a power plant and an oil field to allow for the management of the carbon lifecycle of petroleum.

In another embodiment, the refinery integrated with the system of the current invention produces an emulsified combustion fuel from a heavy vacuum distillate residue. In such an embodiment, the refinery may first convert the heavy vacuum distillate residue at least into a pitch by-product. In one such embodiment, the heavy vacuum distillate is heavy vacuum distillate oil, which is converted in a solvent de-asphalting process. In one such embodiment, the refinery further includes an emulsifier unit for converting the pitch into an emulsified combustion fuel, such as, for example MSAR™ fuel.

In still another embodiment, the combustion facility integrated with the system of the current invention is an electrical generation plant. In such an embodiment one of the by-products of burning the combustion fuel is carbon dioxide. In one such embodiment, the electrical generation plant includes flue gas treatment facilities for capturing substantially all criteria and carbon dioxide emissions. In one such embodiment the power generation plant burns the combustion emulsion fuel in a super-critical boiler.

In yet another embodiment, the crude oil production facility is located proximate to the combustion facility. In one such embodiment, the carbon dioxide produced from burning the combustible fuel is used to enhance the volume of petroleum production from the crude oil production facility. In one such embodiment the crude oil production facility is an oil field and the carbon dioxide is injected into an oil producing formation within the oil field. In such an embodiment the carbon dioxide is preferably pressurized to at least 2000 psi.

In still yet another embodiment, the electricity generated by the power plant is used at least partially in the oil field.

In still yet another embodiment, a transport system is placed in fluid communication between the refinery, the combustion facility and the crude oil production facility. In one such embodiment the transport system is a pipeline.

In still yet another embodiment, the system of the current invention integrates a refinery having a vacuum distillation unit for producing a vacuum distillate residue and a solvent de-asphalting unit for converting the vacuum distillate residue into pitch, an emulsion unit for emulsifying the pitch into an MSAR™ fuel, an electrical generation plant to burn the MSAR™ fuel and produce supercritical carbon dioxide, an oil field located proximate to and in fluid communication with the electrical generation plant such that the pressurized carbon dioxide may be injected into an oil producing formation in the oil field to enhance the volume of oil production, and a pipeline for transporting fluids between the refinery, the power plant and the oil field. In one such embodiment the pipelines include the emulsion pipeline to deliver fuel to the power plant and the crude oil line that moves the incremental crude oil to local refineries.

BRIEF DESCRIPTION OF THE DRAWINGS

The description will be more fully understood with reference to the following figures and data graphs, which are presented as exemplary embodiments of the invention and should not be construed as a complete recitation of the scope of the invention, wherein:

FIG. 4, provides schematic diagrams of droplets of conventional (left) and emulsion (right) fuels;

DETAILED DESCRIPTION OF THE INVENTION

The current invention is directed to an environmentally and economically more efficient petroleum production/refining/utilization system for managing carbon emissions at all stages of the petroleum lifecycle. More specifically, the system of the current invention integrates the release of carbon from refineries such that those sources of carbon may be utilized in a manner beneficial to the efficiency of the overall petroleum processing lifecycle.

Figure 1:
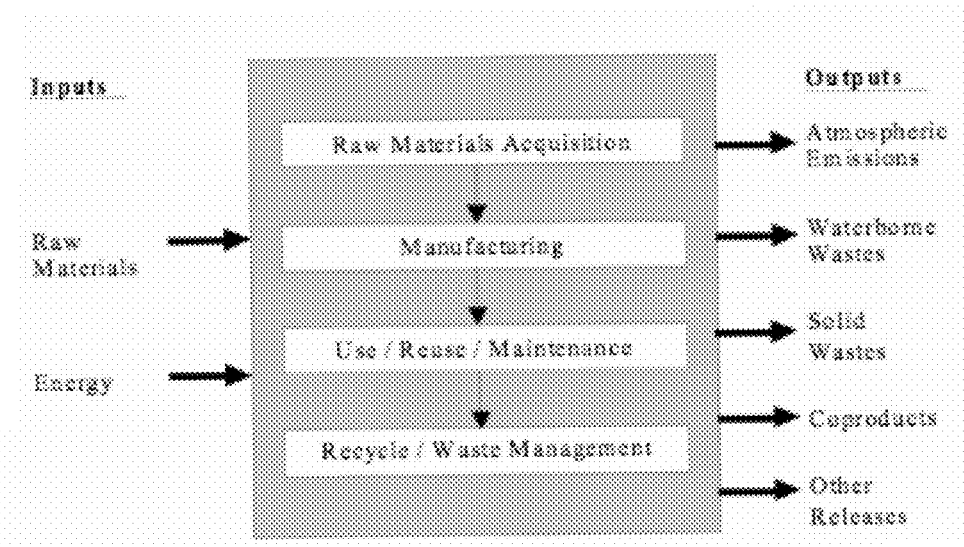
FIG. 1, provides a flowchart of the process for conducting a lifecycle analysis.

Prior to discussing the specific elements of the current invention, it is important to provide an explanation of the concept of lifecycle analysis. The term "life cycle" refers to the major activities in the course of the life-span of petroleum from its refining, transport and use, to its final disposal, including the raw activities required to extract the petroleum. In turn, life cycle assessment is a "cradle-to-grave" approach for assessing petroleum systems. "Cradle-to-grave" begins with the gathering of raw materials from the earth to create the product and ends at the point when the materials are consumed and emissions addressed. To determine the life cycle of petroleum once extracted, it is necessary to evaluate all stages of its life from the perspective that they are interdependent, meaning that one operation leads to the next. FIG. 1 provides a schematic showing the possible stages that can be considered in a life cycle analysis of petroleum and the typical inputs/outputs. Examining the petroleum life cycle enables the estimation of the cumulative environmental impacts resulting from all stages in the product life cycle, often including impacts not considered in more traditional analyses (e.g., raw material extraction, material transportation, ultimate product disposal, etc.). By including impacts throughout the entire life cycle of petroleum, the system of the current invention provides a comprehensive solution to the environmental impacts from petroleum production, refining and utilization, and a more accurate picture of the true environmental trade-offs in conventional process design.

An examination of the petroleum lifecycle based on conventional processes identifies a number of economic and commercial inefficiencies that will be addressed by the system of the current invention. The key to understanding the emissions from petroleum is to understand the carbon balance of the refining process. A typical petroleum feedstock is from between about 83 to 87% carbon, from about 11 to 15% hydrogen, and from about 1 to 6% sulfur. Accordingly, a refinery is essentially a carbon/hydrogen manipulator, tailoring and reshaping molecules and boiling ranges to meet the performance needs of particular fuels. All products and emissions from the refinery originate from the feedstocks. These feedstocks are the main crude oil(s) to be processed, plus other imported feedstocks such as condensates or vacuum gas oils (VGOs), and supplementary natural gas for fuel or hydrogen plants.

Figure 2:
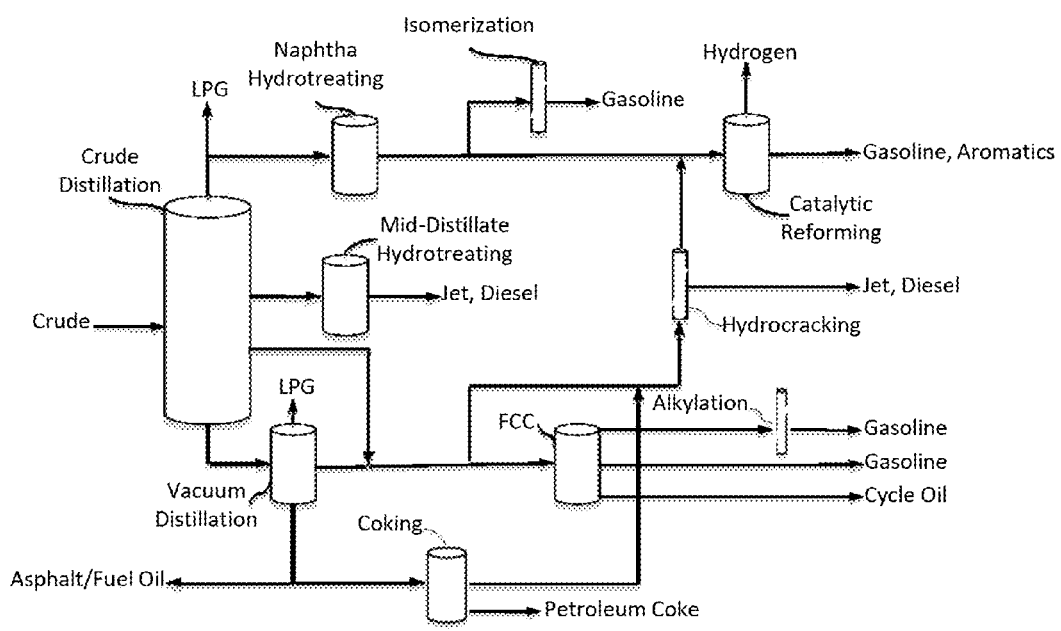
FIG. 2, provides a schematic of a conventional petroleum production and refining system.

As shown in the schematic provided in FIG. 2, a conventional refining process has two principal pathways: crude distillation and vacuum distillation. In a typical refining unit about 60% of all the petroleum feedstock is converted through the crude distillation unit into a high value/high energy combustible product such as gasoline, jet fuel, diesel oil, etc. Another about 30% of the reduced feedstock is also converted to these that high value/high energy combustible products using a combination of vacuum distillation, fluid catalytic cracking and/or hydrocracking. (A summary of the typical yields from the various units of a conventional refinery is provided in Table 1, below.)

TABLE 1

TYPICAL REFINING CONVERSION RATES

| Refining Process | Original Feedstock | Products | Yield |
|---|---|---|---|
| CDU | Crude | High Value Products | ~58% |
|  |  | Reduced Crude | ~42% |
| VDU | Reduced Crude | High Value Products | ~41% |
|  |  | Heavy VGO | ~30% |
|  |  | Residue | ~30% |
| FCC | Heavy VGO | High Value Products | ~95% |
|  |  | Coke | ~5% |

It should be understood that different petroleum grades will yield different percentages, however, the percentages given below would be for a standard light crude oil feedstock.

In short, conventional refining is remarkably efficient at converting nearly 90% of the original petroleum feedstock into high value/high energy content products such as gasoline, jet fuel, diesel, etc. As a result, the vast majority (~70%) of the carbon from the original petroleum feedstock is found in these high value combustible products. However, there are few efficient life cycle pathways for the ~30% of the feedstock that remains as heavy residues after these initial refining steps have been completed. The heavy residue itself is extremely viscous and does not have any inherent value in its unprocessed form. Three exemplary methods currently used to try to recover as much value as possible from these residues are: converting the heavy residue into fuel oil by cutting it with higher-grade fuels, further processing the residue in a coker unit, or producing asphalt. All three of these processes have serious drawbacks.

First, because fuel oil is produced by mixing the heavy residues left over from refining with more valuable feedstocks such as jet fuel, gasoline or diesel oil, the production of fuel oil eats into a refinery's margin. Moreover, the fuel oil produced using these more valuable feedstocks is less valuable, at least partly because the fuel is often not competitive with cleaner burning fuels like natural gas. Because of this the primary use of these fuel oils is as "bunker fuel.", which is used to power ships at sea where there are no emissions regulations. However, environmental restrictions are starting to limit the use of bunker fuels, and may effectively eliminate their use in a few years. Thus, fuel oil may be limited to stationary power plant use, and only for those plants that can handle the $SO_2$ emissions. One of the chief reasons that fuel oil is not an attractive fuel option for such applications is that fuel oils generally burn less efficiently and produce greater emissions. As a result, there are severe environmental restrictions on fuel oil burning plants. In addition, there are additional processing and maintenance costs associated with using fuel oil as a primary combustion source. For example, for many power plants, which are often the end users of fuel oils, the costs of heating the fuel oil in preparation for combustion, the extra pollution controls required by environmental regulations, and the additional maintenance required after burning the oil often outweigh the low cost of the fuel itself. Finally, burning fuel oil, particularly heavy fuel oils, also can produce much darker smoke than natural gas, which affects the perception of the plant by the community. The end result is that most refineries have moved away from producing fuel oil directly, and have instead shifted to further refining of these residues to maximize the production of high value products.

The most common refining process used to convert heavy residue by-products into higher value products, such as gasoline and diesel oil is coking. Coking is a process that takes the heavy residues from the vacuum distillation of the reduced crude and liberates additional high value products either by a continuous or batch thermocracking process. Such coking processes are anywhere from 65 to 80% efficient in producing higher value products such as, for example, light ends, naphtha, light coker gas oils and heavy coker gas oils. However, even using this coking process somewhere between 20 to 35% of the feedstock remains as petroleum coke. Petroleum coke (often abbreviated petcoke) is a carbonaceous solid derived from oil refinery coker units or other cracking processes.

There are a number of different coke grades. Marketable coke is coke that is relatively pure carbon and is often sold for use as fuel (i.e., fuel grade coke), or for the manufacture of dry cells, electrodes (i.e., anode grade coke). Needle coke, also called acicular coke, is a highly crystalline petroleum coke used in the production of electrodes for the steel and aluminum industries. Although its high heat and low ash content make coke a good fuel for power generation in coal fired boilers, petroleum coke is high in sulfur and low in volatile content, which pose significant environmental and technical problems with its combustion. For example, in order to meet current North American emissions standards some form of sulfur capture is required. Finally, because petcoke is a solid, transport of the material is complicated and expensive, and additional processing is required at the combustion site to prepare it for use. Such shadow emissions from energy transport ($CO_2$ emissions derived from transporting the energy offsite) and processing, while not emitted from the refinery itself, are still important when considering the impact of the refinery operations. In addition, cokers require very large capital outlays and have very high operating costs.

Finally, the heavy residue may be converted into asphalt. Asphalt may be formed from components in crude oil (such as naphtha, gasoline and diesel) by the process of fractional distillation, usually under vacuum conditions. A better separation can be achieved by further processing of the heavier fractions of the crude oil in a de-asphalting unit, which uses either propane or butane in a supercritical phase to dissolve the lighter molecules, which are then separated. Further processing is possible by "blowing" the product: namely reacting it with oxygen, which makes the product harder and more viscous. However, the production of asphalt has a number of drawbacks. First, asphalt is not particularly useful as a combustion source. In addition, asphalt typically needs to be stored and transported at temperatures around 300 degrees Fahrenheit (150° C.) causing high energy and transport costs. Moreover, to retain the liquidity of the material during delivery diesel oil or kerosene are mixed in before shipping, and then must be separated out of the mixture prior to use. Finally, the cargo compartments of transport vehicles carrying asphalt, as well as some handling equipment, also need to be sprayed with a releasing agent before filling to aid release, but using these materials can also reduce the quality of the asphalt.

In short, current techniques for extending the lifecycle of the heavy residues left over after refining a petroleum feedstock have the dual problems of producing relatively low value compounds that have significantly higher environmental impacts. Moreover, these products also require significant transport costs before they can be utilized, which adds additional environmental impact to their use. However, the larger problem is that current attempts at carbon management treat each stage of the petroleum lifecycle independently: production is not integrated with processing, processing is not integrated with end use, and there is no ability to close the loop and attempt to reclaim by-products of the processing or use to spur further production. The current invention proposes a system for improving the carbon management of emissions throughout the petroleum lifecycle by integrating the processing and use of these heavy residue by-products from refined petroleum into the production of additional petroleum feedstocks in an economically and environmentally sound manner.

Figure 3:
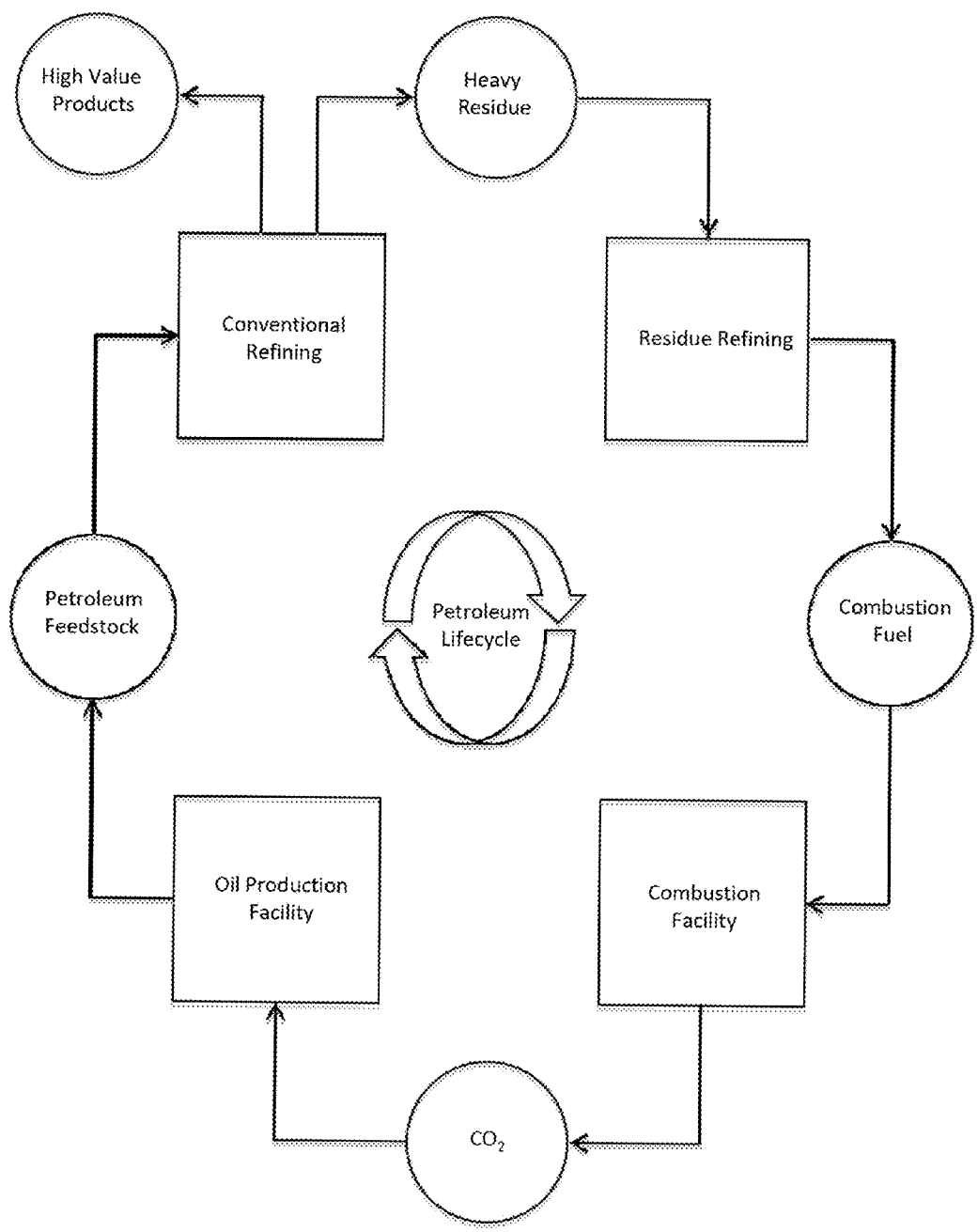
FIG. 3, provides a schematic of a carbon management system for petroleum production and refining in accordance with the current invention.

A schematic of the proposed system is provided in FIG. 3. As shown, the process involves three basic steps: converting the heavy residues from petroleum refining into a combustion source that can be easily transported, transporting that combustion source in an economically viable manner to an end user, and locating the end user in manner such that the emissions from the combustion of the combustion source may be recaptured to both sequester those emissions and produce additional value added materials.

Combustion Source

Turning to the first requirement of the system, the conversion of heavy residues into higher value combustion sources that may be inexpensively transported, there are two sub-requirements: that the combustion source be of a form that provides high economic value without the requirement for expensive blendstocks, and that the end product be easily and inexpensively transportable. As previously discussed, currently heavy residues from conventional refining systems are either converted to heavy fuel oils, petcoke or asphalt. In any case, the end fuel product is of low value and requires high value feedstock, extensive transport and/or further processing before combustion, meaning that the ultimate quantity of carbon released in utilizing the fuel is disproportionate to the actual energy released from the combustion, and the location of the carbon release cannot be controlled. Accordingly, the current system requires at the outset that the refining process be altered to ensure that the energy and carbon content of the end product is in a form that can be moved to an end user inexpensively and efficiently. Principally this requires that a combustible fuel be formed from the refining process that is a liquid having a viscosity at room temperature sufficiently low to allow for the transport of the material through standard pipeline systems. One of the drawbacks of fuel oil, for example, is that though it is a liquid, it has a high initial viscosity and requires a correctly engineered system for storage, pumping, and burning. Moreover, some lower grades of fuel oil must be stored at around 100 F and heated to 150 F before they can be pumped, and at cooler temperatures they can congeal into a tarry semisolid. Indeed, attempting to pump high-viscosity oil at low temperatures is a frequent cause of damage to fuel lines, furnaces, and related equipment, which are typically designed for use with lighter fuels.

One exemplary fuel product that may be used in conjunction with the system of the current invention is a petroleum emulsion. In such an embodiment, the residue by-product from refining would be emulsified into a suspension having a viscosity at room temperature sufficiently low that it is transportable via any desirable means, such as, for example, pipeline or tanker. Accordingly, the current invention proposes to alter the refining process such that the residue produced is amenable to emulsification. Exemplary residues that may be easily emulsified are for example, vacuum residuum, pitch or bitumen, an ultra-heavy crude oil. Vacuum residuum is the residual (bottom) fraction obtained by fractional distillation of crude oil. It is composed of a mixture of organic liquids, primarily of highly condensed polycyclic aromatic hydrocarbons, and is a highly viscous tar-like form of petroleum, which is so thick and heavy that it must be heated or diluted before it will flow. Pitch is the residual product of solvent deasphalting, and is a solid at room temperature. All crude oil residues contain sulfur and several heavy metals such as nickel, vanadium, and also, selenium, and other toxic elements. Although in this raw form pitch is not particularly valuable, nor is it easily transportable, one key difference between pitch and petcoke is that pitch may be formed into an emulsion easily.

Although this pitch may be made from the heavy residues of a typical refinery in accordance to any conventional process, in one exemplary embodiment, the pitch is formed via a solvent de-asphalting process. Solvent de-asphalting is a process in a crude oil refinery that separates the asphalt from the processing crude oil using the fact that light hydrocarbons will solve the remainder of the crude oil, but not the asphaltenes in the crude. The output from the de-asphalter unit is pitch and de-asphalted oil (DAO), which may be further refined into other high value products. In such an embodiment, the solvent de-asphalting unit (SDA) would replace the coking unit in the refinery to process the heavy residues left over from the vacuum distillation process.

Although SDA processing is the preferred method of forming the pitch feedstock for the emulsion fuel, in another embodiment a pitch product can be formed by feeding the heavy reside to a residue hydrocracker or residue FCC unit.

Regardless of the manner in which the pitch is produced, in a preferred embodiment the pitch is emulsified to form an emulsion combustion fuel. In one particularly preferred embodiment a multiphase superfine atomized residue (MSAR™) process, such as the one licensed by Quadrise, a Canadian corporation, is used to emulsify SDA pitch. MSAR™ is an emulsion fuel made from liquid hydrocarbons such as bitumen and heavy refinery bottoms. It is made by combining a liquid heavy hydrocarbon like pitch with water and emulsifiers. The product is a highly stable fuel emulsion consisting of approximately 70 percent hydrocarbon and 30 percent water, with a consistency resembling thin black paint. It is possible to manufacture MSAR™ from virtually any liquid hydrocarbon, and in particular may be formed from low cost hydrocarbon residues. The MSAR™ fuel itself has many uses in the petroleum industry for thermal bitumen recovery, power projects, and in the electrical power industry for refueling large steam power plants. Of particular interest to the current invention, an MSAR™ fuel has a number of benefits, including:

- a reduced viscosity that allows the fuel to be easily handled and transported by ship or pipeline, and stored in conventional unheated fuel oil tanks
- an efficient burn profile that results in over 99 percent carbon burnout, minimizing the fouling of boilers and also reducing particulates and VOC emissions;
- low temperature combustion, which results in a significant reduction in NOX compounds; and
- simple on-site production and storage.

To understand why an MSAR™ fuel has a generally higher burn profile, it is necessary to examine the mechanism of combustion for a conventional liquid hydrocarbon fuel and an MSAR™ fuel. FIG. 4 provides a schematic of a drop of conventional (left) and MSAR™ fuel (right). The drop on the left side of the diagram illustrates the combustion mechanism associated with any liquid hydrocarbon fuel, such as heavy fuel oil or straight bitumen. As the diagram illustrates, during atomization the fuel passes through the burner tip as a drop approximately 80 to 100 microns in diameter. Combustion occurs only on the surface of the drop, and because the time in the combustion chamber can be very short, when large drops are burned, the inner material does not have sufficient time to be burned completely. The unburned material gets hot, becomes sticky, and adheres to the inside walls of the chamber, eventually filling the chamber interior and making the boiler inoperable due to fouling. In contrast, the drop on the right side of the diagram illustrates the combustion of an equivalent sized MSAR™ drop. As shown, during atomization, this 80 to 100 micron drop is formed of thousands of small MSAR™ droplets that are about 5 microns in size. For an equal amount of hydrocarbon feedstock, MSAR™ will have a surface area that is approximately 17 times larger than conventional feedstock. This gives a much larger burning surface, which are ultimately responsible for the excellent combustion characteristics of MSAR™'

One alternative to emulsification of SDA pitch is to solidify the pitch into small uniform spherical particles. This is accomplished by pumping hot liquid pitch through a special forming device that produces small spherical droplets. The droplets pass through a water shower, which cook and solidifies the oil into solid spheres. Water is recovered from the solid pitch for reuse, while the solidified particles are transported by conveyor bell to storage. The drawback to this process is that the solidified pitch must be handled and shipped the same as petcoke, with the same transport limitations.

Transport

The second requirement of the current extended carbon management system is to integrate the production of these residue fuels with an end user such that transport can be achieved as efficiently as possible. Because the product in accordance with the current invention is a liquid fuel having a viscosity sufficiently low enough to allow for transport through most pipeline and liquid handling systems, it is possible to transport the material via any traditional petroleum handling facility, including the use of pipelines, tankers, trucks, etc. However, to reduce the carbon footprint of the system, in a preferred embodiment the combustion fuel production facility is in pipeline connection with the end user of the fuel. For example, the pipeline may be located near a pipeline terminal that interconnects with a pipeline terminal for a power plant or other combustion fuel end user.

Combustion Facility

The final requirement of the current extended carbon management is that the end user of the combustion fuel from the refinery (the combustion facility) be equipped and positioned such that the $CO_2$ formed from the combustion of the combustion fuel may be captured and either sequestered or alternatively utilized to enhance the production of additional petroleum materials, such as, for example, crude oil. To this end, the current system proposes locating the combustion facility at or near a geological formation capable of sequestering the gas. More preferably the combustion facility is located near an active oil field such that the $CO_2$ formed from the burning of the combustion fuel can be captured and piped directly into the field to enhance oil recovery.

$CO_2$ enhanced oil recovery gives the potential for greatly increased oil production from existing oil fields. In some cases this production increase can be 20% or higher. As a result, $CO_2$ sequestration for enhanced oil recovery (EOR) offers an exciting opportunity for both upstream and downstream oil businesses. Enhanced oil recovery is able to extend the useful life of oil fields increasing production significantly. Moreover, while the oil products would clearly benefit from additional oil output, the $CO_2$ producer would also benefit both from the sequestration of the carbon emissions and resultant carbon credits, and possible revenue sharing arrangements with the oil producer. However, gathering and transporting gaseous $CO_2$ to remote oil fields requires specially engineered pipelines, and in most cases is simply impractical both from an technological, an economic perspective, and a permitting perspective.

As such, the current system proposes physically locating the combustion facility on-site at the oil production facility. Although any combustion facility suitable for producing $CO_2$ for use in the enhanced oil recovery process may be used, in a preferred embodiment the current invention proposes that the combustion facility be a power generation plant. A power generation plant offers the possibility of directly burning the emulsion combustion fuel formed in accordance with the current system, and also offers the added benefit that a portion of the power generated by the plant could be used to power the oil production facility while the rest could be fed back into the power grid. Regardless of the nature of combustion facility itself, locating the facility near or at the oil field allows for the $CO_2$ to be captured and introduced into the field without the need to build an extensive $CO_2$ gathering and transport system.

Finally, because the current invention proposes transporting the combustion fuel to the combustion facility via pipeline, locating the combustion facility at or near an oil production site allows for the oil thus produced to be efficiently transported back to the refinery for processing along a return pipeline without requiring the construction of an additional transport network.

SUMMARY

In summary, the current invention proposes a system for managing carbon production and release in the petroleum lifecycle by integrating the production, transport and combustion of the lowest value, highest polluting products from refining with the end user and the oil production facility itself. Through this engineered integration of the various parts of the petroleum lifecycle, it is possible to create a petroleum management system that ensures the highest value is obtained for every barrel of oil at the lowest environmental cost.

EXEMPLARY EMBODIMENTS

The person skilled in the art will recognize that additional embodiments according to the invention are contemplated as being within the scope of the foregoing generic disclosure, and no disclaimer is in any way intended by the foregoing, non-limiting examples.

One embodiment of the present system relates to an improved carbon management system for a conventional refinery. A schematic of the system is provided in FIG. 5. As shown, in this example, a system for recycling carbon from a refinery to an oilfield, while simultaneously generating power and reducing the production of greenhouse gases and criteria pollutants by converting heavy pitch into power and crude oil is proposed. The system of the current invention solves the problem of how to economically deliver large volumes of carbon dioxide to an oil field for enhanced oil recovery (EOR) and/or carbon capture and storage (CCS), while simultaneously providing a significant amount of clean power from a domestic waste energy source by emulsifying refinery pitch, transporting the emulsion on conventional crude oil pipelines, combusting the emulsion fuel near the oil field, and selling the power and $CO_2$ generated by the combustion to the oil field and other users. Although the following example will discuss a specific case involving refineries and oil fields in the Los Angeles basin, it should be understood that the system can be applied other refineries, pipelines, and oil fields.

Crude oil refineries produce gasoline, jet fuel and diesel, however, they also produce tons of petroleum coke. Most of this coke is shipped to distant markets where it is blended with coal and burned in power plants in countries without the strict environmental regulations found in the United States, such as, for example, Asia Pacific or Europe. Refiners receive a low price for the coke relative to the price of natural gas or other fuels. The current invention converts this coke into power and sequesters the carbon dioxide from the combustion of the coke by using it for enhanced oil recovery. A typical refinery complex, such as one of the many located in the Los Angeles Basin, produces about 14,000 tons per day (TPD) of coke. The proposed system would eliminate some 3,500,000 tons per year of $CO_2$, and additionally ~99+% of criteria pollutants that would be created by the combustion of this petroleum coke under the conventional lifecycle scheme. Such a system would also eliminate the need to buy expensive natural gas for power production.

Figure 5:
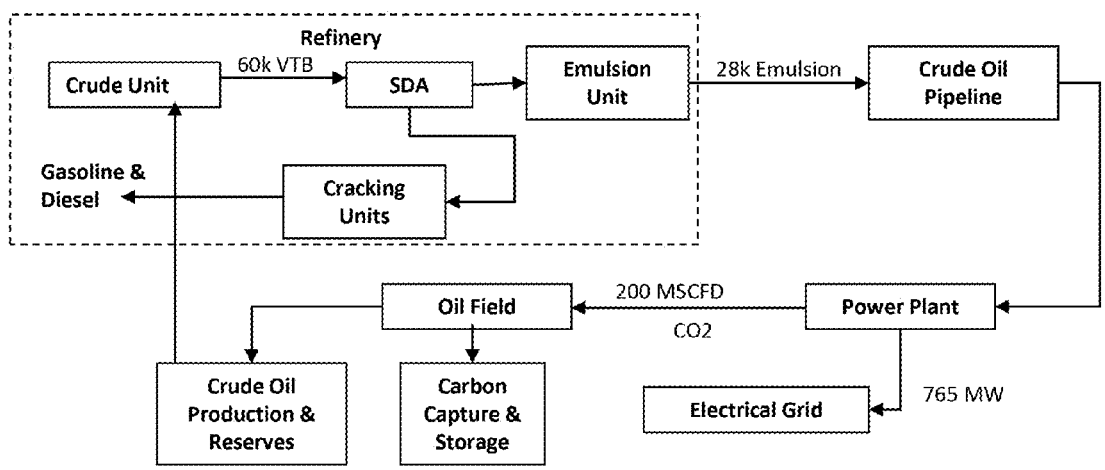
FIG. 5, provides a schematic of a carbon management system for petroleum production and refining in accordance with an exemplary embodiment of the current invention.
Figure 6:
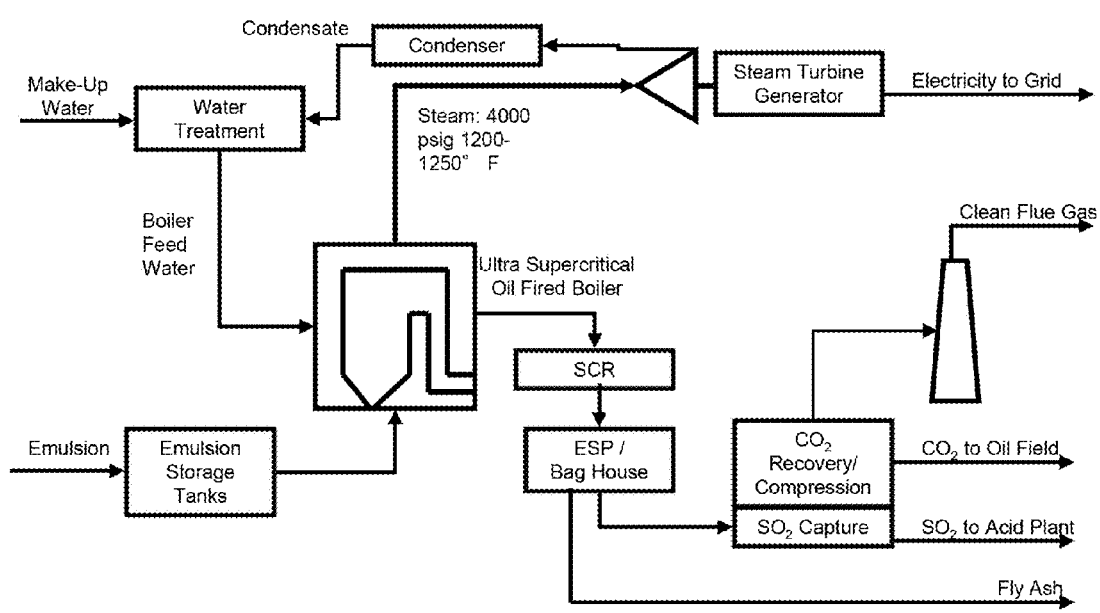
FIG. 6, provides a schematic of a power generation system in association with the carbon management system of FIG. 5.

As shown in FIG. 5, the system in accordance with an exemplary embodiment of the current invention would connect, via pipelines, a refinery with a power plant located on or near an oil field. The refinery itself will be modified to produce a heavy oil emulsion out of the crude oil fraction instead of petroleum coke. This emulsion could then be easily transported via pipeline to a power plant located in or near the oil field. As shown in FIG. 6, the power plant will use ultra-supercritical boilers and employ refinery-based stack scrubbing technologies to emit near zero levels of criteria pollutants like SOx, NOx, VOC's and particulates. Ninety percent of the $CO_2$ emitted will be recovered by employing $CO_2$ capture systems that would then allow the $CO_2$ to be piped into the oil field for enhanced oil recovery. The additional oil produced from the field could then be piped back to the refinery for processing via a return pipeline.

Taking the example of a refinery that previously produced 3,000 TPD of coke, using the system of the current invention, it would be possible to instead covert that heavy residue into some 28 thousand barrels per day (KBD) of a heavy oil emulsion. Such quantities of emulsion would be able to power an electrical plant producing some 700-800 MW of power. In turn, powering such a plant would produce some 200 million standard cubic feet per day (MSCFD) of $CO_2$. With typical enhanced oil recovery techniques a ton of $CO_2$ will produce two barrels of crude oil. Accordingly, the roughly 11,000 metric tons per day (MTD) of $CO_2$ could be used to produce about 22 KBD of crude oil.

Modified Refining Process

The initial focus of the current system is on modifying the refining process to allow for the extension of the carbon lifecycle of normally underutilized heavy residue by-products. As discussed above, a refinery's production capacity is bottlenecked by the volume of the "bottom of the barrel." material that it can process via coking. The current invention proposes to install a solvent deasphalting unit (SDA) to relieve the bottleneck, allow additional crude oil processing, and provide the pitch feedstock for use in the emulsion process. In such a system, the SDA would process all the vacuum tower bottoms (VTB) the refinery currently sends to the coker, which for a refinery capable of processing 176 KBD would be about 60 KBD. The SDA produces deasphalted oil (DAO) and pitch. The DAO produced can be further refined to yield high-value products by the existing secondary processing units, however, like coke, pitch is an end-of-the-line by-product that cannot be further refined to obtain high-value products. On the other hand, unlike coke the pitch from the SDA can be fed to an emulsifier to produce an emulsion that can be inexpensively transported to an end user for combustion without further processing. Although any suitable emulsification process can be used, in a preferred embodiment the emulsifier used would be an MSAR™ Unit capable of producing an emulsion called MSAR™ (Multiphase Superfine Atomized Residue). The MSAR™ technology is licensed by Quadrise of Canada. The MSAR™ can then be pumped via standard transport techniques to the end user, such as, for example, a power plant.

Not only does this refining conversion make environmental sense, it also would improve the economics of the refining process. For example, the on-site cost of the SDA is estimated at $125 million, and although the yield of DAO is close to the yield of coker gasoils, the operating costs for an SDA are lower because of reduced operating personnel needs and lower feedstock heating requirements. In addition, reduced heating not only reduces fuel costs, it reduces criteria pollutants and $CO_2$ emissions from the refinery itself.

An example of a refinery that could be profitably converted using the current invention would be one of the many refineries located in the Los Angeles basin. One such refinery is owned by a company that is also a co-owner in a nearby oil field. This refinery is an excellent candidate for four reasons: first, a solvent deasphalting unit will relieve residual oil processing constraints allowing higher crude oil run rates; second, both the outbound and inbound pipelines intersect on its property; third, such a project would reduce GHG emissions, helping the refinery come into compliance with AB 32. The facility has a VTB production rate of 60 KBD, which means it is possible to produce about 28 KBD of the emulsion fuel using the system of the current invention.

Transport

As previously discussed, one of the drawbacks of conventional petroleum refining systems is the transport costs involved in moving the end products. For example, because coke is a solid that is not amenable to pipeline transport, all coke produced in refineries must be trucked to the end user. Eliminating this trucking would itself eliminate a significant amount of NOx, SOx, particulates and $CO_2$ emissions. Depending on the regulations of the jurisdiction in question, it is possible for the refiner to obtain a significant volume of valuable emission credits for reducing these truck trips. The credits can, in some circumstances, be applied to refinery expansion projects. Accordingly, producing an emulsion, instead of coke, will eliminate much of the emissions associated with the production of pet coke, and reduction of $CO_2$ emissions will help the refinery meet its emissions requirements.

For example, in the Los Angeles refinery coke is transported via truck to either the port of Los Angeles or Long Beach for export. A round trip from the refinery to the port and back is about 25 miles and the coker makes 3,000 TPD of coke. A coke truck and trailer holds about 25 tons. This means that the number of trucks making this trip daily is about 120. Accordingly, by converting the facility from a conventional refining process to the current integrated system would reduce truck traffic by more than one million miles per year. Moreover, movement by pipeline is far less expensive than an alternative like trucking. For example, assuming a tariff of $1.00 per barrel, and a density of five barrels of emulsion fuel per ton, the tariff to move emulsion fuel by pipeline would equate to $5.00 per ton. The cost to move the emulsion fuel by truck would be about $22 per ton.

Power Generation

Again, although any combustion fuel end user may be used with the current system, in an exemplary embodiment the end user is a power generation facility located at or near an oil production field. In such an embodiment, it is preferred that the plant have as efficient a system as possible for combusting the emulsion fuel and converting the carbon from the emulsion fuel into $CO_2$. In one exemplary embodiment, the power generation plant uses a direct fired, ultra-supercritical boiler, producing steam at approximately 4000 psig and 1200 F for power production. In such an embodiment, a plant consuming about 28 KBD of emulsion fuel would be able to produce about 900 MW of energy with 750 MW sold into the grid and 150 MW consumed by flue gas recovery of criteria pollutants and $CO_2$. Using refinery based flue gas treating it is possible to create near zero criteria emissions and 90% $CO_2$ recovery. The $CO_2$ would then be used for enhanced oil recovery in the oil field. Although this example suggest the use of a supercritical boiler, it will be obvious that a sub-critical boiler may also be used with the fuels of the current invention.

The integration of a power generation plant is also attractive because of the growing need for "clean" power generation alternatives around the world. Using California as an example, according to the California Energy Commission's 2008 *Integrated Energy Policy Report Update*, a significant issue related to electricity procurement is the potential effect on electricity reliability of retirement or repowering of aging power plants combined with restrictions on the use of once-through cooling in existing and new power plants. Accomplishing this would require the refitting, repowering, replacement, or retirement of 19 power plants representing nearly 40 percent of the state's electricity generating capacity, making power generation a critical issue in the coming decade. (See, 2008 Integrated Energy Policy Report Update", California Energy Commission, CEC-100-2008-008-CTF, the disclosure of which is incorporated herein by reference.)

In terms of the power generation plant itself, it should be understood that any power generation plant capable of burning the emulsion fuel and capturing the $CO_2$ produced therefrom may be used. However, the specifications of a preferred embodiment of such a plant are provided in FIG. 6 and discussed below. As shown, in one exemplary embodiment the power plant will use a single 5 million pound per hour steam boiler, supplied by a major boiler vendor. Fuel to the boiler will come from an emulsion fuel storage tanks located at the boiler site, and will be pumped to the boiler using standard heavy hydrocarbon pumps. Water makeup to the boiler and cooling towers will come from local sources, such as brine associated with crude oil production and city treatment plant effluent water. Steam from the boiler, at approximately 4,000 psig and 1250° F., will be routed to a single steam turbine generator set, which will consist of high-pressure, intermediate-pressure and low-pressure turbines. Steam from the low-pressure turbine will be exhausted to a water-cooled condenser for maximum heat extraction. The turbine will turn a generator, which will produce approximately 900 MW of power. Some of the power generated will be used internally by the unit, while the rest will be sent to oil production facility or to the grid. The boiler will have a Selective Catalytic Reduction (SCR) system to remove NOx, and an electrostatic precipitator or bag house to remove particulates, from the flue gas. Subsequent wet scrubbing with amine solutions will remove $SO_2$ and $CO_2$ from the flue gas. The $SO_2$ can be captured and sold as liquid $SO_2$, or converted to other sulfur compounds, such as sulfuric acid. The $CO_2$ will be compressed and dried, then either sequestered or piped to the crude oil production field for use in enhanced oil recovery. In practice, more than one boiler and steam turbine generator set may be used, and other means of capturing and disposing of particulates and $SO_2$ may be used.

Figure 7:
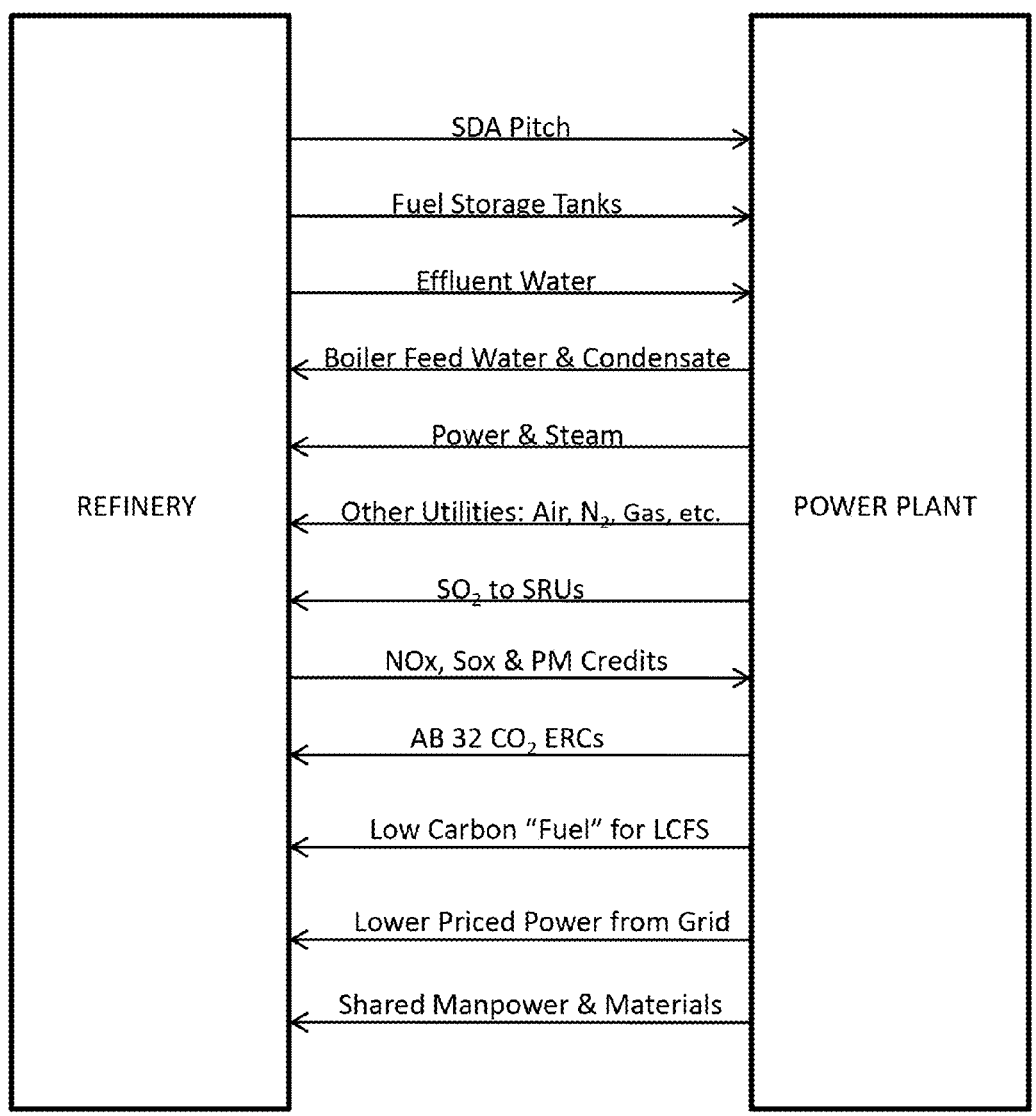
FIG. 7, provides a flow chart showing the efficiencies gained by co-location of the power generation facility and the refinery in accordance with one embodiment of the current invention.

Although the above embodiment assumes that the power generation plant would be co-located with the oil production field, in another alternative embodiment, the power generation plant could be co-located with the refinery. Locating the power plant near the refinery can create multiple synergies. These include the use of the refinery sulfur plants to dispose of sulfur dioxide (SO2) from the power plant, and common use of utilities, such as plant and instrument air, nitrogen, boiler feed water and condensate. Refinery waste water can also be cleaned up and reused as boiler and cooling tower makeup water for the power plant. This in turn will eliminate the costs associated with disposing of refinery waste water in local disposal wells, while reducing makeup water costs for the power plant. Finally, in such an embodiment both electrical and steam connections can be made between the power generation facility and the refinery, for everyday use or for use in emergencies. A schematic of the numerous efficiencies gained by such a co-location are provided in FIG. 7.

Petroleum Production

The last stage of the carbon management system of the current invention would be to capture and inject the $CO_2$ from the combustion of the emulsion fuel at the power plant into the oil field. In such an embodiment, the $CO_2$ would be injected into the oil field at high pressure (at least ~1000 psig, and preferably at least ~2000 psig) to create a miscible flood. At high pressure, the $CO_2$ will help dissolve the oil in the formation and move it to the production wells. Publically available sources estimate that injection of a ton of $CO_2$ at high pressure can result in the production of two barrels of oil. Accordingly, a power plant burning 28 KBD of emulsion fuel would produce an estimated 11,000 tons of $CO_2$ per day, which could equate to 22 KBD of crude oil. An added benefit to the power generator would be the ability to charge the oil producer for the use of what would otherwise be waste $CO_2$. In fields in West Texas where $CO_2$ enhanced oil recovery has been used, a price of up to $40 per ton for $CO_2$ has been charged by producers to oil field operators for the gas.

Any $CO_2$ capture unit may be used, such as those produced by Cansolv Technologies in Montreal, Canada. Major equipment typically consists of an absorber tower, stripping tower, five heat exchangers and four pumps. Heating of the stripper tower will be done by steam from the boiler, and cooling of the stripper overhead stream will be done by water-cooled exchangers. Stripped $CO_2$ will go to the $CO_2$ compressor for compression to 2000 psig. At a point in the compression, the $CO_2$ will go to a glycol drying system to remove excess water, and then return to the compressor for final compression. The compressor system consists of the 4-stage compressor, water-cooled intercoolers, vessels, piping and instrumentation, and controls. $CO_2$ from the compressor will be delivered to the oil field at a pressure of at least 1000 psig, ready for down-hole use.

Again, although this system may be used generically with any refinery/oil field combination, in an exemplary embodiment, the emulsion fuel from the LA refinery complex could be transported via pipeline to the nearby light oil field. Production at this field in 2007 was 11.5 KBD and reserves are estimated at 49,518 million barrels. (See, "2007 Annual Report of the State Oil. & Gas Supervisor", California Department of Conservation, Division of Oil, Gas, & Geothermal Resources, Sacramento, the disclosure of which is incorporated herein by reference.) It is estimated that the oil field would require about 150-200 MSCFD of $CO_2$ for twenty years or more.

DOCTRINE OF EQUIVALENTS

Those skilled in the art will appreciate that the foregoing examples and descriptions of various preferred embodiments of the present invention are merely illustrative of the invention as a whole, and that variations in the steps and various components of the present invention may be made within the spirit and scope of the invention. For example, it will be clear to one skilled in the art that additional processing steps or alternative configurations would not affect the improved properties of the integrated carbon management system of the current invention nor render the system unsuitable for its intended purpose. Accordingly, the present invention is not limited to the specific embodiments described herein but, rather, is defined by the scope of the appended claims.

What is claimed is:

1. An integrated petroleum carbon management system comprising:
    a vacuum distillation unit in a petroleum refinery serving as a source of petroleum heavy vacuum distillate residue;
    a residue processor in fluid communication with said source of heavy vacuum distillate residue for converting at least a portion of said heavy petroleum residue into an emulsifiable product;
    an emulsion unit in fluid communication with said residue processor for emulsifying said emulsifiable product into a combustible emulsion fuel;
    a combustion facility designed to burn said combustible emulsion fuel and produce gaseous carbon dioxide;
    an oil production facility proximate to and in fluid communication with said combustion facility such that said carbon dioxide may be used to enhance the volume of petroleum production from said oil production facility; and
    a transport system in fluid communication between said emulsion unit, said combustion facility and said petroleum extraction facility.

2. The integrated petroleum carbon management system of claim 1, wherein the heavy vacuum distillate is heavy distillate oil.

3. The integrated petroleum carbon management system of claim 1, wherein the combustion facility is a power generation plant that further produces electrical power, and wherein said power generation plant is in fluid communication with said petroleum refinery such that sulfur dioxide produced from said power generation plant is transported to said refinery for treatment.

4. The integrated petroleum carbon management system of claim 3, wherein further waste water produced from said refinery is reused as boiler feed water and condensate by said power generation plant.

5. The integrated petroleum carbon management system of claim 3, wherein the petroleum refinery is in electrical communication with said power generation plant, and wherein at least a portion of the electrical power is utilized for petroleum refinery operations.

6. An integrated petroleum carbon management system comprising:
　　a source of petroleum heavy vacuum distillate residue;
　　a residue processor comprised of a solvent de-asphalting unit, in fluid communication with said source of heavy vacuum distillate residue for converting at least a portion of said heavy petroleum residue into an emulsifiable product comprised of pitch;
　　an emulsion unit in fluid communication with said residue processor for emulsifying said emulsifiable product into a combustible emulsion fuel;
　　a combustion facility designed to burn said combustible emulsion fuel and produce gaseous carbon dioxide;
　　an oil production facility proximate to and in fluid communication with said combustion facility such that said carbon dioxide may be used to enhance the volume of petroleum production from said oil production facility; and
　　a transport system in fluid communication between said emulsion unit, said combustion facility and said petroleum extraction facility.

7. The integrated petroleum carbon management system of claim 6, wherein the combustion emulsion fuel is an emulsion of pitch, water and emulsifier.

8. The integrated petroleum carbon management system of claim 7, wherein the combustion emulsion fuel is a multiphase superfine atomized residue fuel.

9. An integrated petroleum carbon management system comprising:
　　a source of petroleum heavy vacuum distillate residue;
　　a residue processor in fluid communication with said source of heavy vacuum distillate residue for converting at least a portion of said heavy petroleum residue into an emulsifiable product;
　　an emulsion unit in fluid communication with said residue processor for emulsifying said emulsifiable product into a combustible emulsion fuel;
　　a combustion facility comprised of a power generation plant that produces electrical power, designed to burn said combustible emulsion fuel and produce gaseous carbon dioxide;
　　an oil production facility proximate to and in fluid communication with said combustion facility such that said carbon dioxide may be used to enhance the volume of petroleum production from said oil production facility; and
　　a transport system in fluid communication between said emulsion unit, said combustion facility and said petroleum extraction facility.

10. The integrated petroleum carbon management system of claim 9, wherein the power generation plant burns the combustion emulsion fuel in one of either a sub-critical boiler or a super-critical boiler.

11. The integrated petroleum carbon management system of claim 9, wherein the petroleum extraction facility is in electrical communication with said power generation plant, and wherein at least a portion of the electrical power is utilized for oil production facility operations.

12. An integrated petroleum carbon management system comprising:
　　a source of petroleum heavy vacuum distillate residue;
　　a residue processor in fluid communication with said source of heavy vacuum distillate residue for converting at least a portion of said heavy petroleum residue into an emulsifiable product;
　　an emulsion unit in fluid communication with said residue processor for emulsifying said emulsifiable product into a combustible emulsion fuel;
　　a combustion facility designed to burn said combustible emulsion fuel and produce gaseous carbon dioxide, wherein emissions from the burning of the combustion emulsion fuel are treated using a refinery flue gas treatment system;
　　an oil production facility proximate to and in fluid communication with said combustion facility such that said carbon dioxide may be used to enhance the volume of petroleum production from said oil production facility; and
　　a transport system in fluid communication between said emulsion unit, said combustion facility and said petroleum extraction facility.

13. The integrated petroleum carbon management system of claim 12, wherein the flue gas treatment system eliminates substantially all non-carbon dioxide emissions and collects at least 90% of carbon dioxide emissions.

14. An integrated petroleum carbon management system comprising:
　　a source of petroleum heavy vacuum distillate residue;
　　a residue processor in fluid communication with said source of heavy vacuum distillate residue for converting at least a portion of said heavy petroleum residue into an emulsifiable product;
　　an emulsion unit in fluid communication with said residue processor for emulsifying said emulsifiable product into a combustible emulsion fuel;
　　a combustion facility comprised of a power generation plant that produces electrical power, designed to burn said combustible emulsion fuel and produce gaseous carbon dioxide;
　　an oil production facility comprised of an oil field having at least one oil producing formation, proximate to and in fluid communication with said combustion facility such that said carbon dioxide may be used to enhance the volume of petroleum production from said oil production facility; and
　　a transport system in fluid communication between said emulsion unit, said combustion facility and said petroleum extraction facility.

15. An integrated petroleum carbon management system comprising:
　　a source of petroleum heavy vacuum distillate residue;
　　a residue processor in fluid communication with said source of heavy vacuum distillate residue for converting at least a portion of said heavy petroleum residue into an emulsifiable product;

an emulsion unit in fluid communication with said residue processor for emulsifying said emulsifiable product into a combustible emulsion fuel;

a combustion facility designed to burn said combustible emulsion fuel and produce gaseous carbon dioxide;

an oil production facility comprised of an oil field having at least one oil producing formation and wherein carbon dioxide is injected into said at least one oil producing formation, proximate to and in fluid communication with said combustion facility such that said carbon dioxide may be used to enhance the volume of petroleum production from said oil production facility; and a transport system in fluid communication between said emulsion unit, said combustion facility and said petroleum extraction facility.

16. The integrated petroleum carbon management system of claim 15, wherein the carbon dioxide is pressurized to at least 1000 psig prior to injection.

17. An integrated petroleum carbon management system comprising:

a source of petroleum heavy vacuum distillate residue;

a residue processor in fluid communication with said source of heavy vacuum distillate residue for converting at least a portion of said heavy petroleum residue into an emulsifiable product;

an emulsion unit in fluid communication with said residue processor for emulsifying said emulsifiable product into a combustible emulsion fuel;

a combustion facility comprised of a power generation plant that produces electrical power, designed to burn said combustible emulsion fuel and produce gaseous carbon dioxide;

an oil production facility proximate to and in fluid communication with said combustion facility such that said carbon dioxide may be used to enhance the volume of petroleum production from said oil production facility; and a transport system comprised of at least one pipeline, in fluid communication between said emulsion unit, said combustion facility and said petroleum extraction facility.

18. An integrated petroleum carbon management system comprising:

a refinery having a vacuum distillation unit for producing a vacuum distillate residue and a solvent de-asphalting unit in fluid communication with said vacuum distillation unit for converting at least a portion of said vacuum distillate residue into pitch;

an emulsion unit in fluid communication with said solvent de-asphalting unit for emulsifying said pitch into an multiphase superfine atomized residue fuel;

an electrical generation plant designed to burn said multiphase superfine atomized residue fuel and produce pressurized gaseous carbon dioxide;

an oil field having at least one oil producing formation, said oil field being located proximate to and in fluid communication with said electrical generation plant such that said pressurized carbon dioxide may be injected into said oil producing formation to enhance the volume of oil production from said oil field; and a pipeline in fluid communication between said refinery, said power plant and said oil field.

19. The integrated petroleum carbon management system of claim 18, wherein the electrical generation plant burns the multiphase superfine atomized residue fuel in one of either a sub-critical or super-critical boiler.

20. The integrated petroleum carbon management system of claim 18, wherein emissions from the burning of the multiphase superfine atomized residue fuel are treated using a refinery flue gas treatment system.

21. The integrated petroleum carbon management system of claim 20, wherein the flue gas treatment system eliminates substantially all non-carbon dioxide emissions and collects at least 90% of carbon dioxide emissions.

22. The integrated petroleum carbon management system of claim 18, wherein the carbon dioxide is pressurized to at least 1000 psig prior to injection.

23. The integrated petroleum carbon management system of claim 18, wherein the oil field is in electrical communication with said power generation plant, and wherein at least a portion of the electrical power is utilized for oil field operations.

* * * * *